E. CURTISS.

CIDER-MILL.

No. 6,799. Reissued Dec. 14, 1875.

WITNESSES.

J. Wm. Garner

Frank M. Burnham.

INVENTOR.

Enos Curtiss, per

F. A. Lehmann, Atty.

UNITED STATES PATENT OFFICE.

ENOS CURTISS, OF FINDLEY, OHIO.

IMPROVEMENT IN CIDER-MILLS.

Specification forming part of Letters Patent No. 160,397, dated March 2, 1875; reissue No. 6,799, dated December 14, 1875; application filed November 24, 1875.

*To all whom it may concern:*

Be it known that I, ENOS CURTISS, of Findley, in the county of Hancock and State of Ohio, have invented certain new and useful Improvements in Cider-Mills; and I do hereby declare that the following is a full, clear, and exact description thereof, that will enable others skilled in the art to which it appertains to make and use the same, reference being had to the accompanying drawings and to the letters of reference marked thereon, which form a part of this specification.

My invention relates to an improvement in cider-mills, and aims to combine in a single machine both a cider mill and press that shall be cheap, portable, and convenient for use, and to obviate the difficulties which have hitherto prevented the juice from being completely extracted from the apple. Heretofore the apples have been reduced by grinding, or otherwise, to a pomace, from which a considerable portion of the juice can be expressed by the application of great pressure only. By grating the apples I find, by experiment, that the juice can be quite readily expressed by passing them, thus grated, between two cylinders made of any suitable material that is best adapted for this work. These cylinders are placed parallel, and made to incline slightly downward, so that the pomace will fall down between them to the ground, while the juice runs along in the trough formed by them to the spout. By this arrangement not only is the juice more readily and easily expressed, but I am enabled to do away with the usual endless belt, that only serves to clog the mill. It will be seen that the grating of the apples and the expressing of the juice is carried on at the same time in my mill, and the work is performed quicker and more effectually, while less power is required to perform the labor.

In order to enable others skilled in the art to which my invention appertains to make and use the same, I will now proceed to describe its construction and operation, reference being had to the accompanying drawings, and to the letters of reference thereon.

Figure 1:
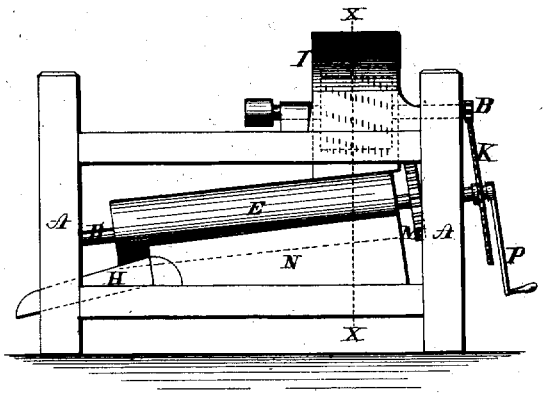
Figure 2:
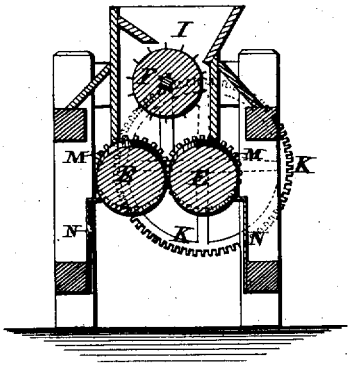

Figure 1 is a side elevation of my invention. Fig. 2 is a vertical section taken through the lines *x x*, Fig. 1.

A represents the frame-work, within which are placed the smooth cylinders E, revolving on their axes D at an inclination of about ten degrees, or sufficiently to cause the cider to find its way to the spout H. The wheel K meshes with the pinion B, placed on the end of the shaft that passes through the hopper I, and to which the drum F is secured. This drum is placed just below the opening in the bottom of the hopper, and is provided with teeth, that are placed at irregular intervals, so that when made to revolve it grates the apples to a fine pomace, which pomace falls upon the cylinders E just below. These cylinders, made of any suitable material, are geared together by the cog-wheels M, and placed parallel close together at such an inclination that the hollow between them forms a trough, down which the cider runs to the spout. These cylinders revolve inwardly toward each other, compressing the juice thoroughly from the pomace, after which the pomace falls through to the ground below. Secured to the frame in any suitable manner, on each side, is a thin sheet of zinc or other metal, N, turned near their upper edges, and fitted to touch lightly the cylinders E, so as to act as scrapers to remove any of the grated apple which may have adhered to the cylinders in their upward revolution. The apples having been placed in the hopper I, by turning the handle P the wheel K engages with the pinion B, and causes the drum F to revolve. The wheels M, engaging together, cause the cylinders E to revolve rapidly toward each other, compressing the grated pomace as it falls upon them from above, so that the juice is thoroughly extracted from it, and runs down the incline to the trough, where it escapes into the receiver.

Having thus described my invention, I claim—

1. In a cider-mill, the inclined rollers E, geared together so as to revolve toward each other, and forming a trough, down which the cider runs to the receiver, as specified.

2. In a cider mill and press, the inclined rollers E, in combination with the shafts D, cog-wheels M, handle P, and spout H, substantially as shown.

3. The combination of the inclined rollers E and their shafts D with the frame A, toothed drum F, hopper I, pinion B, driving-wheel K, handle P, cog-wheels M, scrapers N, and spout H, substantially as described.

In testimony that I claim the foregoing I have hereunto set my hand this 10th day of November, 1875.

ENOS CURTISS.

Witnesses:
PETER PIFER,
WM. CREIGHTON.